Patented Feb. 5, 1929.

1,701,085

UNITED STATES PATENT OFFICE.

WILLIAM D. RICHARDSON AND ROY CHESTER NEWTON, OF CHICAGO, ILLINOIS, ASSIGNORS, BY DIRECT AND MESNE ASSIGNMENTS, OF ONE-HALF TO SWIFT & COMPANY, OF CHICAGO, ILLINOIS, A CORPORATION OF ILLINOIS, AND ONE-HALF TO ALBERT MUSHER, OF WASHINGTON, DISTRICT OF COLUMBIA.

SALAD DRESSING.

No Drawing.   Application filed June 4, 1925.   Serial No. 35,011.

This invention relates to improvements in salad dressing and, more particularly, to a concentrated or solid salad dressing, and includes the new concentrated or solid salad dressing, as a new product, as well as a new and improved method of producing such a concentrated or solid product. The invention also includes, as a new article of manufacture, a package product comprising a package, such as a paste-board carton, containing the new concentrated or solid salad dressing.

The new salad dressing of the present invention is a concentrated or solid salad dressing capable of being brought to a fluid consistency by the addition of a fluid vehicle such as oil or water or both together. The new product is an emulsified product in a concentrated or solid state, so emulsified that it can be brought to the fluid condition by stirring with a suitable liquid, such as an oil or water or both together.

In making the new salad dressing, instead of using oil, such as is commonly used, we use a blend or mixture of oils and fats of normally solid consistency. Such a blend or mixture may be made, for example, by adding to ordinary salad oil, enough solid fats to bring the mixture to the consistency of firm butter, or to such a consistency that it will be solid at ordinary temperatures. In producing such a solid mixture, we may make use of various oils and fats in varying proportions. Such oils and fats as olive oil, cotton-seed oil, corn oil, peanut oil, cocoanut oil, oleo oil, oleo stock, oleostearin, neutral lard, hydrogenated or partially hydrogenated oils and other edible vegetable and animal oils may be used. The ingredients of the mixture are so proportioned and blended as to give a product of the desired solid consistency, e. g., of a melting point of 80 to 110° F. for ordinary purposes. A somewhat lower or higher melting point may, however, be used, depending upon such considerations as the temperature and the climate of the place in which the product is to be shipped or used. In summer, for example, a somewhat stiffer formula, containing a somewhat increased amount of solid fats, may be used, while in winter, the amount of solid fat may be somewhat reduced to give a somewhat softer product.

The mixing and blending of the oils and fats may be carried out as a preliminary operation and the resulting blended product used in making the new salad dressing; or the mixing and blending of the ingredients may take place immediately preceding the manufacture of the dressing.

In making the new solid salad dressing the mixture of oils and fats of normal solid consistency is heated, if previously prepared, or the oils and fats are softened and melted together, so that, when the other ingredients are compounded therewith, the blended oils and fats will be of liquid consistency, and not of their normal solid consistency. With the heated liquid mixture there are compounded the various other ingredients desired in the salad dressing, such as condiments, eggs, etc. The formula or composition used in making the new concentrated or solid salad dressing may vary, much as different salad dressings commonly vary, but with the compounding of the blended fat mixture of normally solid consistency in place of the usual salad oils. The ordinary condiments such as vinegar, lemon juice, salt, pepper, mustard, sugar, etc., will be used in the desired proportion, together with eggs and other suitable ingredients, such as emulsifying agents, etc.

Having selected the various ingredients, the normally solid mixture of oils and fats is heated and melted, or the desired mixture of oils and fats is made by blending the ingredients in the heated state; and the condiments, eggs, and other ingredients, such as emulsifying agents, etc. are introduced therein, and the whole is mixed or churned together at a temperature above that of the solidifying point of the blended oil and fat mixture. After the mixing operation, the product is emulsified at a temperature somewhat higher than its solidifying point. This emulsification may be effected by means of a suitable emulsifying machine. As such an emulsifying machine we may advantageously make use of a stone mill, but other suitable emulsifying devices may be used, such, for example, as whipping or beating machines of the kind commonly used for making mixtures, emulsions and salad dressings, or other suitable form of emulsifying mill. The emulsification can advantageously be carried out in a continuous manner and with continuous discharge of the emulsified product from the device.

During the emulsification, the temperature of the product is maintained somewhat higher than its solidifying point, and the temperature of the product issuing from the emulsifying device should be somewhat above but approximating the setting point of the product. This product is then caused to solidify, for example, by allowing it to stand at ordinary atmospheric temperatures, or by chilling it in a chill room or in a special chilling machine, for example, such as that described in the Richardson U. S. Patent No. 1,312,424. As a result of the cooling or chilling of the mixture from a temperature somewhat above its setting point to a temperature below its solidifying point, the product is converted into a solid state at ordinary temperatures so that the product is a normally solid product.

The solid product thus obtained may be handled much as butter is handled. It may be cut or worked into prints in any of the customary ways, as by wire cutting or by a mechanical print machine.

The new concentrated or solid product of the present invention has many advantages. It can be marketed in the form of a brick or print, much as butter is marketed. It may be packaged in a suitable carton like butter, for example, in the form of a brick or print, and from this brick or print a suitable amount can be sliced off at will without detriment to the rest of the brick. It can then be returned to the carton in the same manner as a print of butter. The new product is a concentrated product capable of dilution with a suitable liquid to give a materially increased amount of salad dressing of ordinary salad dressing consistency. The new product enables a marked economy to be obtained in cost of transportation and in weight of product to be shipped and stored.

In using the new concentrated salad dressing, a portion of the solid product may be sliced off with a knife, introduced into a suitable vessel, and worked with a suitable quantity of oil or water, or both together, as desired, with a spoon, fork, or egg beater. Instead of using oil and water, other liquid diluents or ingredients such as cream, lemon juice, etc. may also be used. In order to facilitate this diluting and mixing operation, the solid product may first be softened by heat, or softened at the same time the fluid admixture is being made and the mixture is being worked together. An egg beater or other suitable mechanical device may be used to facilitate the mixing operation. Depending upon the dilution of the concentrated or solid product, the salad dressing obtained may be of a fluid consistency or may be of a more viscous or pasty consistency.

The concentration and ingredients of the concentrated or solid product can be varied. The ingredients are preferably adjusted so that from 1 to 2 parts of oil or water to 1 part of the new concentrated or solid product will produce a salad dressing of customary consistency and flavor. The new concentrated product may thus be considered a double strength or triple strength salad dressing. Such a multiple strength salad dressing makes it possible to make an amount of ordinary salad dressing therefrom equal to, e. g. 2 or 3 times the amount of the solid product used.

Ordinary salad dressing as now marketed is of fluid or pastry consistency and requires a container, such as a bottle, suitable for a product of such consistency. The new product of the present invention is of normally solid consistency, and may advantageously be packaged in paste-board cartons with a paper lining much as butter is packaged. Such packages may be, for example, of 1-pound size, or may be ¼-pound or other fractional size, while the new product may also be packaged in larger packages, e. g., in 5-pound packages. The larger size packages permit of cutting off slices of varying thickness to give any desired weight to the new product. Similarly the slices so cut off and sold to the customer may be in turn cut into thinner slices or into smaller pieces for use as desired in making salad dressing of normal consistency. The smaller size individual packages may similarly be used by the purchaser in cutting from the solid product contained in the package the desired amount of concentrated product for use in making a salad dressing of normal consistency. The invention thus provides both a new commercial product in the form of a concentrated product of solid consistency, and a new commercial package product in the form of a carton, such as a paste-board carton, containing the new product of normally solid consistency.

It will thus be seen that the present invention provides a concentrated salad dressing in solid form so emulsified that it can be brought to the fluid condition by stirring with a suitable liquid. It will also be seen that the invention provides a new method of making such a concentrated or solid product by blending oils and fats to give a mixture of normally solid consistency, by admixing with such oils and fats, while in a heated and liquid state, the condiments, eggs, and other desired ingredients, and emulsifying the mixture at a temperature somewhat above its solidifying point, and by then solidifying the emulsified product by lowering its temperature. The new concentrated or solid product presents many advantages, such as those above mentioned, making possible the handling of the product in a manner radically different from that in which the usual liquid or pasty salad dressings are handled. The product may nevertheless be converted into a much larger amount of salad dressing of normal consistency by a simple admixture of suitable liquid, such as an oil or water or both together.

We claim:

1. The method of making a salad dressing which comprises blending oils and fats to give a mixture solid at ordinary temperatures, mixing therewith while in a heated and fluid state spices, salt, vinegar and the like, emulsifying the resulting mixture at a temperature somewhat higher than its solidifying point, and cooling the emulsified product to give a normally solid salad dressing.

2. The process of preparing a solid salad dressing which comprises adding to a mixture of oils and fats of normally solid consistency spices, salt, vinegar and other ingredients of a salad dressing, mixing the same together at a temperature somewhat above the solidifying point, and subjecting the mixture to an emulsifying operation.

3. The method of preparing a solid salad dressing which comprises subjecting to emulsification, at a temperature somewhat above the solidifying point of the mixture, a mixture of oils and fats of normally solid consistency together with spices, salt, vinegar and other usual ingredients of a salad dressing, and cooling the emulsified product.

4. The method of preparing a solid salad dressing which comprises subjecting to emulsification, at a temperature somewhat above the solidifying point of the mixture, a mixture of oils and fats of normally solid consistency together with spices, salt, vinegar and other usual ingredients of a salad dressing, the emulsification being carried out in a continuous manner and with regulation of the temperature of the product issuing from the emulsifying device so that it is just above its setting point, and then cooling and solidifying the product.

5. The method of preparing a solid salad dressing which comprises forming a mixture of oils and fats of normally solid consistency, and adding spices, salt, vinegar and other usual ingredients of salad dressing thereto.

6. A concentrated solid salad dressing containing an emulsion of oils and fats of normally solid consistency and spices, salt, vinegar and the like, said emulsion being capable of being brought to a fluid condition by stirring with a suitable liquid.

7. A concentrated solid salad dressing containing a mixture of oils and fats of normally solid consistency, and spices, salt, vinegar and the like, said product being self-sustaining at ordinary temperatures and therefore capable of being marketed in pasteboard cartons.

In testimony whereof we affix our signatures.

WILLIAM D. RICHARDSON.
R. C. NEWTON.